United States Patent [19]

Oehmke

[11] 4,098,945

[45] Jul. 4, 1978

[54] SOFT CONDUCTIVE MATERIALS

[75] Inventor: Richard W. Oehmke, Hudson Township, St. Croix County, Wis.

[73] Assignee: Minnesota Mining and Manufacturing Company, Saint Paul, Minn.

[21] Appl. No.: 714,396

[22] Filed: Aug. 16, 1976

Related U.S. Application Data

[63] Continuation-in-part of Ser. No. 383,836, Jul. 30, 1973, abandoned, which is a continuation of Ser. No. 173,857, Aug. 23, 1971, abandoned.

[51] Int. Cl.² .............................................. B32B 5/16
[52] U.S. Cl. .................................. 428/327; 252/500; 252/512; 252/513; 252/514; 260/37 R; 260/37 M; 260/823; 428/323; 428/325; 428/332; 428/336; 428/343; 428/355; 428/356
[58] Field of Search ............... 428/323, 325, 403, 343, 428/355, 356, 332, 328, 336; 252/502, 511–514; 260/897 A, 37 M, 37 R, 823

[56] References Cited

U.S. PATENT DOCUMENTS

| Re. 24,906 | 12/1960 | Ulrich .................................. 428/355 |
| 2,808,352 | 10/1957 | Coleman et al. ...................... 428/344 |
| 3,412,043 | 11/1968 | Gilliland .............................. 428/514 |
| 3,475,213 | 10/1969 | Stow ..................................... 428/328 |
| 3,609,104 | 9/1971 | Ehrreich .............................. 252/512 |
| 3,746,662 | 7/1973 | Adelman .............................. 427/79 |
| 3,876,454 | 4/1975 | Snell et al. ............................ 428/355 |

Primary Examiner—George F. Lesmes
Assistant Examiner—P. Thibodeau
Attorney, Agent, or Firm—Cruzan Alexander; Donald M. Sell; Warren R. Bovee

[57] ABSTRACT

A soft, conformable, conductive composition comprises a polymeric binder system; a purality of insoluble, soft, spherical, deformable, generally nonreactive domains dispersed in the system interjacent the domains, held in the matrix thereof, such that at least one electrically conductive pathway is formed through said composition. The conformable, conductive composition has many applications where a moldable, pliable, adherent conductive juncture or interface is desired.

12 Claims, 4 Drawing Figures

SOFT CONDUCTIVE MATERIALS

This application is a continuation-in-part of my co-pending application Ser. No. 383,836, filed Jul. 30, 1973, now abandoned which in turn is a continuation of application Ser. No. 173,857, filed Aug. 23, 1971, and now abandoned.

The present invention relates to soft, conformable, conductive compositions having a plurality of soft, deformable, nonconductive domains in a plurality of conductive pathways around and interjacent those domains and through said composition in a plurality of dimensional planes. More particularly, the present invention relates to a soft, conformable, conductive composition comprising a binder system, a plurality of insoluble soft, spherical, deformable, generally nonreactive, nonconductive domains dispersed in the binder and an electrically conductive filler dispersed in the binder interjacent the domains, the conductive filler providing conductive pathways through the composition. Still more particularly, the spherical domains are soft, nonconductive microspheres which impart the required softness, flexibility and conformability to the composition while lessening the amount of conductive filler required to provide conductivity in the composition.

In the present state of technology, electrical conductivity in one form or another has been very desirable if not essential for many applications. One of the main problems here has been to provide a conductive interface between two already conductive bodies or surfaces. This is presently most generally accomplished by inserting a sheet of conductive material between those conductive bodies so that the electrical current may flow from one body to the other. However, where the interface between such conductive bodies is difficult to reach or is of such irregular configuration that the insertion of a sheet of relatively rigid conductive material does not provide for uniform contact across the surfaces of the conductive bodies, there is a need for a conductive, pliable, soft, conformable material that may be conveniently applied or inserted in areas where a relatively rigid sheet of conductive material would not be suitable. Further, it would be desirable in some situations to have a conductive, conformable adhesive material such that the conductive material would be normally tacky in relationship to various other surfaces, thus insuring good electrical contact therebetween.

Various attempts have been made to provide conductivity in certain materials such that they will carry an electrical current. For example, gelatin, polyvinylalcohol, and the like, may be made electrically conductive by the addition of ionizable salts and humectants. These materials are defective in that their conductivity is dependent on relative humidity. Another method has been to plate the surfaces of a non-conducting object with a metal such that the current may be carried over the surface thereof. This method is not always satisfactory in that the distribution and pathway for the current is limited to following the exterior of the material and the interior remains in its original nonconductive state.

Various materials have also been filled with conductive fillers such that a current may be carried directly through them. Many such examples are described in the book, "Conductive Rubbers and Plastics" by R. H. Norman (Elsevier Publishing Co., 1970). It is stated therein that it is not possible to produce a very soft, highly conductive rubber. Generally, conductive rubbers or plastics have Shore A hardness in excess of 40 which is too hard for most applications. Most examples of this filled class of compositions do not include an efficient means for structuring the conductive portions of the material for maximum conductivity at a given level of conductive filler. Such a method is illustrated in U.S. Pat. No. 2,671,854, issued to Coler. In Coler, conductivity is imparted into the material by coating plastic particles with a conductive metal and then molding the material into a conductive article. This procedure helps solve the problem of conductivity through a material, but only in respect to relatively rigid and solid articles. The requirement for a large amount of conductive material in such articles does not allow for conformability and flexibility of the material once it has been filled with the conductive metal particles. Further, the unconductive plastic itself is relatively non-flexible.

Consequently, there are no soft, conformable, flexible, conductive materials useful for a wide variety of applications at a conductive interface known to applicant at the present time.

According to the present invention there are provided soft, conductive materials useful for providing an electrically conductive interface between two or more other conductive areas with the advantage that these materials are conformable and moldable to various surface deviations on the other conductive surfaces. More particularly, there is provided a soft, conductive composition which contains insoluble, soft polymer domains and a conductive filler preferably both being held in the matrix of a polymeric binder which is preferably a soluble bulk polymer or prepolymer system. Still further, the present invention provides a soft, conformable, conductive composition which comprises generally a soluble polymer or curable, soluble, prepolymer system; a plurality of insoluble, soft, spherical, deformable, generally nonreactive domains having a diameter of from about 5–250 microns randomly dispersed in the system; and an effective amount of electrically conductive particles dispersed in the system interjacent the domains; wherein the particles form electrically conductive pathways through the composition, the domains imparting conformability, moldability, and flexibility to the composition. As used herein a soft material is generally one having a Shore A hardness of less than about 40 and an effective amount of electrically conductive particles is that amount which is necessary to provide conductivity through the composition.

The invention will be better understood with reference to the drawing wherein.

Figure 1:
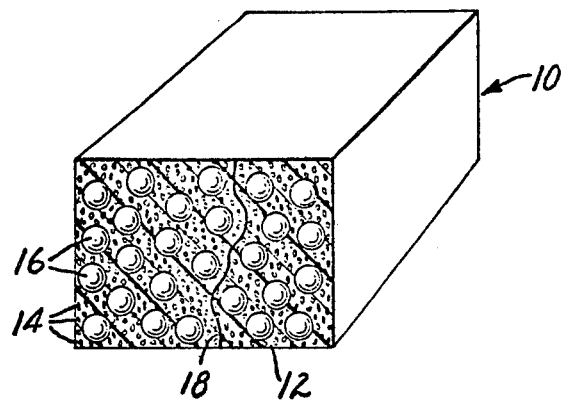
FIG. 1 is a greatly enlarged cross section of a portion of the conductive composition of the present invention.

The general mechanics of the present invention will be best understood with reference to FIG. 1. The soft, conformable, conductive composition of the present invention 10, in its preferred embodiment, comprises a soluble polymer or a curable, soluble, prepolymer system 12 which acts as a matrix for a plurality (major amount) of insoluble, soft microspheres 16 and a plurality (minor amount) of conductive particles 14. The problem in developing a soft, conductive material employing the methods known in the art is that the mere saturation of the binder system 12 with conductive particles 14 results in a relatively nonconformable material because of the large amount of nonconformable conductive particles needed to insure that continuous conductive pathways will be readily available. Consequently, by employing enough conductive material to make the entire composition conductive, the desired conformability and flexibility are lost. If only enough conductive material is used such that the binder system remains conformable and flexible, then electrical conductivity through the entire composition is lost or greatly diminished.

Applicant discovered that if soft, preferably spherical, deformable domains were dispersed in the binder system to retain the desired conformability and flexibility, and conductive particles were dispersed around and interjacent said spherical domains, a conformable conductive material resulted with much less conductive material required to attain a given level of conductivity.

A large amount of conductive material is not needed because a large amount of the space in the binder system is taken up by the spherical domains. Concentrating the conductive material interjacent these domains provides a pathway around the domains and through the conductive material as illustrated by the number 18 in FIG. 1. Consequently, the required conformability and flexibility is retained through the soluble prepolymer system and the deformable nonreactive domains, and conductivity is maintained through the use of a relatively low amount of conductive material residing around and interjacent those domains such that at least one electrically conductive pathway 18 is formed through the composition. In another aspect of the present invention, depending on the deformability and flexibility of the domains used, the soluble polymer or prepolymer system is not required.

The domains used in the present invention must be soft, conformable and generally nonreactive. The domains are preferably spherical to maintain a minimum surface area for the domains, thus providing for maximum utilization of the conductive fill. Where the domains are of irregular shape, more conductive fill might be required to provide an electrically conductive path around the irregularities, although irregular shaped domains may also be used. Where the domains are spherical, the size of the domains ranges in the neighborhood of from about 5–250 microns, preferably about 6–80 microns. The preferred average size of the spherical domains is about 50 microns. Generally the composition contains about 15 to 60% spherical domains, based on the volume of the total composition. About 50–60% by volume of spherical domains in the total composition is preferred.

Examples of suitable soft, deformable domains which may be used are acrylic microspheres prepared as described hereinafter, finely ground insoluble elastomers, such as vulcanized natural rubber or polyurethane, and crosslinked suspension polymerized elastomer particles which are redispersible after removal of the suspending solvent. Preferably, acrylate copolymer microspheres are used. These microspheres are elastomeric polymers which are uniformly spherical, solvent insoluble and of small size. The acrylate copolymer microspheres consist essentially of about 90 to about 99.5% by weight of at least one alkyl acrylate ester and about 10 to about 0.5% by weight of at least one monomer selected from the group consisting of substantially oil-insoluble, water-soluble ionic monomers and maleic anhydride. Preferably, the microspheres comprise about 95 to about 99% by weight acrylate monomer and about 5 to about 1% by weight ionic monomer, maleic anhydride, or a mixture thereof.

The alkyl acrylate ester monomer portion of the copolymer microspheres, may comprise one ester monomer or a mixture of two or more ester monomers. Similarly, the water soluble, substantially oil insoluble monomer portion of the copolymer microspheres may comprise maleic anhydride alone, an ionic monomer alone, a mixture of two or more ionic monomers, or a mixture of maleic anhydride with one or more ionic monomers.

The alkyl acrylate ester portion of these microspheres consists of those alkyl acrylate monomers which are oleophilic, water-emulsifiable, of restricted water-insolubility and which, as homopolymers, generally have glass transition temperatures below about $-20°$ C. Alkyl acrylate ester monomers which are suitable for use in preparing these microspheres include iso-octyl acrylate, 4-methyl-2-pentyl acrylate, 2-methyl-butyl acrylate, sec-butyl acrylate, and the like. Acrylate monomers with glass transition temperatures higher than $-20°$ C. (i.e., tert-butyl acrylate, iso-bornyl acrylate or the like) may be used in conjunction with one of the abovedescribed acrylate ester monomers.

The water-soluble ionic monomer portion of these microspheres is comprised of those monomers which are substantially insoluble in oil. By substantially oil-insoluble and water-soluble it is meant that the monomer has a solubility of less than 0.5% by weight and, a distribution ratio at a given temperature (preferably $50°$–$65°$ C.), of solubility in the oil phase monomer to solubility in the aqueous phase of less than about 0.005, i.e., $$D = \frac{\text{total concentration in organic layer}}{\text{total concentration in aqueous layer}}$$

Table I illustrates typical distribution ratios (D) for several water-soluble, substantially oil-insoluble ionic monomers.

TABLE I

| Oleophilic Monomer | Temp. ° C. | Hydrophilic Monomer | D |
|---|---|---|---|
| iso-octyl acrylate | 50 | 1,1-dimethyl-1(2-hydroxypropyl)amine methacrylimide | 0.005 |
| " | 50 | 1,1,1-trimethylamine methacrylimide | 0.0015 |
| " | 65 | " | 0.003 |
| " | 50 | N,N-dimethyl-N-(β-methacryloxyethyl) ammonium propionate betaine | <0.002 |
| " | 65 | " | 0.003 |
| " | 65 | 4,4,9-trimethyl-4-azonia-7-oxo-8-oxa-dec-9-ene-1-sulfonate | <0.002 |
| " | 65 | 1,1-dimethyl-1(2,3-dihydroxypropyl)amine methacrylimide | 0.0015 |
| " | 65 | sodium acrylate | <0.001 |
| " | 65 | sodium methacrylate | <0.001 |
| " | 65 | ammonium acrylate | <0.001 |
| " | 65 | maleic anhydride | 0.02 |

Ionic monomers conforming to the preceding criteria include sodium methacrylate, ammonium acrylate, sodium acrylate, (I) trimethylamine p-vinyl benzimide, (II) 4,4,9-trimethyl-4-azonia-7-oxo-8oxa-dec-9-ene-1- sulphonate, (III) N,N-dimethyl-N-(β-methacryloxyethyl) ammonium propionate betaine, (IV) trimethylamine methacrylimide, (V) 1,1-dimethyl-1(2,3-dihydroxypropyl)amine methacrylimide; any zwitterionic monomer having the preceding solubility requirements and the like.

The copolymer microspheres are small in size, having diameters in the range of about 1 to about 250 microns, the diameter of the majority of the spheres falling in the range of about 5 to about 150 microns. The spheres are normally tacky and elastomeric, are insoluble in organic solvents, and form suspensions in all common solvents except highly polar solvents such as water, methanol, and ethanol. Typical useful solvents are ethyl acetate, tetrahydrofuran, heptane, 2-butanone and other ketones, benzene, cyclohexane, esters, iso-propanol, and higher alcohols. When dispersed, the microspheres absorb the solvent and swell to about twice their original diameter, or about eight times their original volume. After dispersion, the microspheres, which contain about 80% solvent, remain homogeneously dispersed for extended periods of time. When the dispersed microspheres are sprayed or coated on a surface, the solvent quickly evaporates, the microspheres shrinking to approximately their original size. A force applied directly to one of the polymer spheres will deform it; however, the spherical shape is reassumed upon release of the stress. Upon being heated, the spheres do not melt or flow, but retain their integrity until carbonization temperature is reached. Tack properties of the microspheres may be altered by inclusion of various resins in the solvent or aqueous suspensions of microspheres.

The microspheres of the invention are prepared by an aqueous suspension polymerization technique utilizing anionic emulsifiers in an amount greater than the critical micelle concentration in the absence of protective colloids, finely divided inorganic solids, or the like. Heretofore, suspension polymerizations conducted in the absence of such materials and at high emulsifier levels, i.e., above the critical micelle concentration, have yielded latices of extremely small particle size, which are solvent-soluble, fusible particles, The critical micelle concentration is here defined as that minimum concentration of emulsifier necessary for the formation of micelles. Critical micelle concentration is slightly different for each emulsifier, usable concentrations ranging from about $1.0 \times 10^{-4}$ to about 3.0 moles/liter. Nonionic emulsifiers may also be included so long as an ionic emulsifier is present and predominates. Catalysts for polymerizing the monomers to provide the spheres of the invention are those which are normally suitable for free-radical polymerization of acrylate monomers and which are oil-soluble and of very low solubility in water such as, for example, benzoyl peroxide. Use of a water-soluble catalyst causes formation of substantial amounts of latex, the extremely small particle size and solubility of latex particles being undesirable. Concentration of catalyst will affect sphere quality and, therefore, should be on the order of about 0.15 to about 0.6% by weight, of the total suspension, preferably about 0.25 to about 0.45%. Catalyst concentrations below about 0.15% may cause agglomeration of spheres, whereas a concentration greater than 0.6% results in low molecular weight polymer which does not exhibit all of the desired properties.

Following polymerization, the aqueous suspension of copolymer microspheres is stable to agglomeration or coagulation under room temperature conditions. The copolymer suspension may have non-volatile solids contents from about 10 to about 50% by weight. Upon prolonged standing, the suspensions will separate into two phases, the lower phase being aqueous and substantially free of polymer, the upper phase being an aqueous dispersion of polymer spheres. Decantation of the upper phase provides a low viscosity aqueous suspension having a non-volatile solids content on the order of about 75% which, if shaken with water, will readily redisperse.

If desired, the aqueous dispersion of microspheres may be utilized immediately following polymerization to provide inherently tacky coatings or adhesives. The aqueous dispersion may be coagulated with methanol, saturated salt solutions, or the like, followed by washing and drying. These dried polymer spheres, with sufficient agitation, will readily suspend in the previously mentioned wide variety of common organic solvents. Once the polymer is dried, however, it is not redispersible in water.

The shrinkage of individual microspheres during drying when in a coated continuous layer results in a porous coating of microspheres having particular utility for such items as surgical dressings or draperies, where passage of air and water vapor through the adhesive coating is necessary, conventional adhesives generally being continuous and retarding passage of air and water vapor.

The binder systems useful in the present invention can be any soft or rubbery material, or any material capable of being cured to a soft rubbery state, which will form a coherent matrix for the microspheres and conductive filler. Preferably the binder is a soluble bulk polymer or prepolymer system. As noted previously, the binder should be capable of providing a soft composition having a Shore A hardness of less than about 40. Examples of such materials are urethanes, block copolymers, ethyl acrylate, and the like. Preferably, the binder system is selected from the group consisting of silicone polymer, urethane rubber, a cross-linkable polymer of an olefinic precursor, a diene rubber, a block copolymer containing a diene rubber block, and a cross-linkable polymer of a vinyl precursor.

In one embodiment, the binder system is itself a pressure-sensitive adhesive so that the entire conductive composition will immediately adhere to conductive surfaces upon contact. The preferred polymeric, pressure-sensitive adhesive binder systems are the alkyl alcohol esters of acrylic acid such as those disclosed in U.S. Pat. No. 24,906, the disclosure of which is hereby incorporated by reference. The most preferred pressure-sensitive adhesive binder systems are iso-octyl acrylate-acrylamide copolymer adhesive and an iso-octyl acrylate and acrylic acid copolymer adhesive. A variety of other pressure-sensitive adhesive binder systems can be used in the present invention. The literature is replete with discussion and description relating to these materials. Specific examples of representative adhesive binder systems that may be used are tackified polybutene adhesive (U.S. Pat. No. 3,451,537), tackified rubber resin adhesives (U.S. Pat. Nos. 3,681,190 and 3,778,306), vinyl ester adhesives (U.S. Pat. No. 3,770,708), tackified polyurethane adhesives (U.S. Pat. No. 3,718,712), and the like.

In another embodiment of the present invention, the binder is a relatively soft, soluble, elastomeric polymer so that the entire composition, while not generally as soft as an adhesive, is still able to conform to the small irregularities in hard conductive surfaces which are connected with a sheet or gasket of the conductive material of the invention between them. Also, the binder can be a soluble prepolymer which can be cured to a relatively soft, elastomeric composition which is conformable, but which also possesses resistance to a wide variety of organic solvents.

The conductive material used should be of a particulate configuration. Examples of such materials are carbon black, graphite and metals such as silver, nickel and copper. The average size of the particulate material and the amount present in the composition will vary with the type of conductive material used. A surprisingly low amount of conductive filler is necessary. For example, where nickel particles are used, it is preferred that the particles have an average particle size of from 2–4 microns and are present in the composition at from about 1 to 25% by volume. Only about 15% carbon black would be necessary.

The conductive filler may actually be coated particles, an example of which is a silver-coated ceramic particle commercially available as "Silclad G-100" from Sigmatronics Co. Where metal-coated particles are used, their size range may vary from approaching 0 microns to something less than 100 microns, preferably from about 0.3 microns to 30 microns. Where the silver-coated ceramic particles are used, the average diameter is from about 5–40 microns and the particles comprise from about 5–60% by volume of the entire conductive composition.

According to the invention, soft, conductive materials can be prepared which have the advantages normally found in pressure-sensitive adhesive fastening or bonding with the additional advantage of being electrically conductive. Also, previously unavailable soft conductive gaskets and the like can be prepared. The compositions are based on the application of the domain-network concept under which a given conductivity can be obtained with more reliable electric "contact" at lower levels of conductive fillers which provides both an economic saving and a superior retention of the desirable properties of the unfilled polymer system, such as tackiness, conformability, elasticity, and the like. Further, being preferably based on inherently soft compositions, the composition does not contain plasticizers or extending oils which may leach or bleed out with the subsequent loss of adhesion, hardening, or staining of the substrate to which it is applied. Even further, the compositions also provide a resistance to a greater range of organic solvents, many of which attack oil-extended, plasticized polyolefin compositions. The compositions are thus less subject to softening and running when exposed to elevated temperatures.

The electrically conductive, soft compositions of the present invention provide a point-to-point conductivity. The term point-to-point conductivity as used herein means that more than 99% of a series of metal contacts, each about 0.016 square inches (0.036 cm$^2$) in area, provide a closed circuit to a metallic grounding plate through a film of the material being tested. The compositions are useful for a wide variety of applications which include peelable adhesive fastening of metallic materials without interruption of the electrical conductive pathway between them, stick-on anodic protection strips composed of the adhesive on an active metal foil, grounding tapes, fastening sacrificial anodes to metallic objects to protect them from corrosion, making soft conductive gaskets and rollers, adhesively fastening metallic objects together without breaking the electrical path through them, etc.

Resistances of the compositions of the present invention were measured by solvent coating a 2–5 mil film of the material onto a copper foil ground plate and then determining the potential drop through the film when a current of 100 ma. was passed through the conductive film to the plate. The top electrode consisted of a 1 square inch gold-plated brass electrode which was held down with a force of 5 pounds per square inch during the measurement. The resistances were then calculated using Ohm's law, the volume resistivity calculated using the equation:

$$Ro = \rho(1/s)$$

wherein $Ro$ is resistivity expressed in Ohm centimeters, $\rho$ is the measured resistivity of the composition, 1 is the thickness of the composition in centimeters, and s is the total area of the composition in square centimeters. Adhesion of the material was defined as the force required to peel a one inch wide strip of adhesive coated soft copper foil from a stainless steel plate at an angle of 180°. The values of force are regarded as ounces per inch width of peel.

Figure 2:
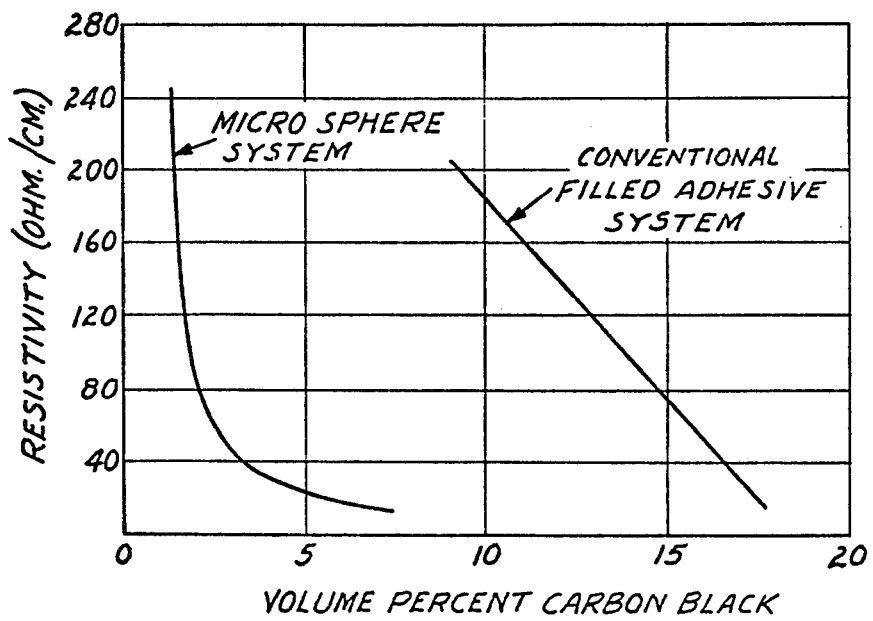
FIG. 2 is a graph illustrating the improved conductive properties of the composition of the present invention in comparison to a soluble non-domain containing (homogeneous) adhesive systems.
Figure 3:
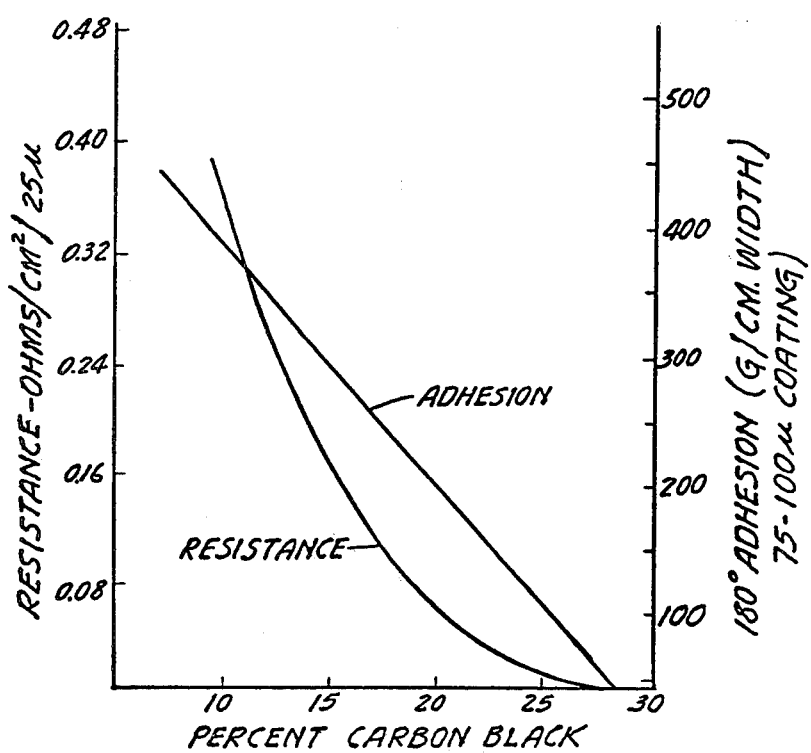
FIG. 3 is a graph illustrating the loss of adhesion at low resistance of conventionally filled adhesives.

The utilization of the domain-network principle of the present invention is illustrated in FIG. 2. FIG. 3 is merely to illustrate the loss of adhesion at low resistance experienced with a conventionally filled adhesive. Correlation of the data in FIG. 2 with that in Table II below demonstrates the uniqueness of the domain-network system. In FIG. 2, the domain network system (microsphere) of the present invention is compared with a conventionally filled adhesive system. As illustrated therein, the increasing addition of sphere domains to a conductive carbon filled adhesive with a corresponding decrease in the overall loading of carbon black fill does not greatly effect the resistance. A similar decrease of overall carbon black load without a corresponding addition of microspheres in the ordinary adhesive system results in a dramatic increase in resistance. The data in Table II illustrates further that within a given range of adhesion, the resistance of the carbon filled domain-network system is less than half of that of the ordinary carbon soluble adhesive mixture. Electrical measurements with various types of contacts indicates that this difference is due to the ability of the domain-network system to make superior electrical contact. It has also been found that such contacts are more reproducible and reliable when using the domain-network system.

TABLE II

| Microsphere-Adhesive Dispersions - Carbon Filled | | | | | |
|---|---|---|---|---|---|
| Percent Spheres | Percent Carbon | Percent Adhesive | 180° Adhesion (gm/cm width) | Caliper (mm) | Resistance (ohms/cm$^2$) |
| 0 | 22.6 | 77.4 | 88 – 143 | 0.05 | 0.034 |
| 24.4 | 17.1 | 58.5 | 55 – 99 | 0.056 | 0.0134 |
| 32.6 | 15.2 | 52.2 | 88 – 132 | 0.056 | 0.0125 |
| 39.2 | 13.7 | 47.1 | 88 – 154 | 0.054 | 0.0128 |
| 44.6 | 12.6 | 42.8 | 88 – 154 | 0.058 | 0.0107 |

Figure 4:
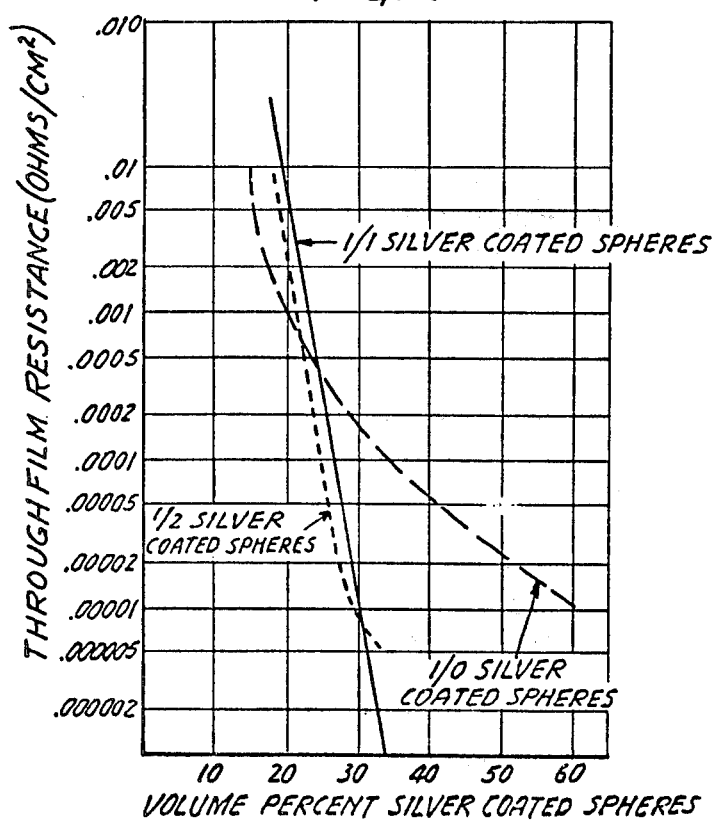
FIG. 4 is a graph illustrating the varying conductive properties of the composition of the present invention where the conductive filler is ceramic spheres coated with a conductive silver material.

The data plotted in FIG. 4 and the data in Tables III, IV, and V indicate that the addition of adhesive microspheres to a silver-coated, sphere-adhesive system as described heretofore results in an increased conductivity for a given level of conductive filler, results in an increase of adhesion at a given level of conductivity and results in an economic saving because a given level of conductivity can be obtained with fewer silver-coated spheres. The ratios 1/1, ½ and 1/0 shown in FIG. 4 refer to the ratio by volume of the quantity of silver-coated spheres to soft, insoluble adhesive microspheres.

TABLE III

| Volume Percent Spheres | Volume Percent Adhesive | Volume Percent Silver-coated Spheres | Adhesion (gm./cm. width) | Resistance (ohms/cm.$^2$) |
|---|---|---|---|---|
| 32 | 36 | 32 | 11 | 0 |
| 28.6 | 42.8 | 28.6 | 44 – 66 | $4 \times 10^{-5}$ |
| 25.6 | 48.8 | 25.6 | 177 – 209 | $1.4 \times 10^{-4}$ |
| 22.6 | 54.8 | 22.6 | 264 – 287 | $2.7 \times 10^{-3}$ |
| 20.0 | 60.0 | 20.0 | 310 – 341 | $7.4 \times 10^{-3}$ |
| 17.6 | 64.8 | 17.6 | 320 – 341 | $2.1 \times 10^{-2}$ |

TABLE IV

| Volume Percent Silver-coated Spheres | Volume Percent Adhesive | Adhesion (gm./cm. width) | Resistance (ohms/cm$^2$) |
|---|---|---|---|
| 60 | 40 | 0 | $1.1 \times 10^{-5}$ |
| 50 | 50 | 0 | $2.6 \times 10^{-5}$ |
| 40 | 60 | 23 – 33 | $8 \times 10^{-5}$ |
| 29.4 | 70.6 | 66 – 110 | $1.6 \times 10^{-4}$ |
| 24.6 | 75.4 | 161 – 198 | $7 \times 10^{-4}$ |
| 20 | 80 | 275 – 310 | $1.2 \times 10^{-3}$ |
| 15.3 | 84.6 | 310 – 353 | $1 \times 10^{-2}$ |

TABLE V

| Volume Percent Spheres | Volume Percent Adhesive | Volume Percent Silver-coated Spheres | Adhesion (gm./cm. width) | Resistance (ohms/cm.$^2$) |
|---|---|---|---|---|
| 61 | 8.5 | 30.5 | 0 | $8 \times 10^{-6}$ |
| 55.4 | 16.9 | 27.7 | 11 – 22 | $4.5 \times 10^{-5}$ |
| 50.3 | 24.4 | 25.2 | 44 – 55 | $5.1 \times 10^{-5}$ |
| 45.8 | 31.3 | 22.9 | 77 – 161 | $1.4 \times 10^{-4}$ |
| 41.6 | 37.6 | 20.8 | 232 – 320 | $1.1 \times 10^{-3}$ |
| 37.4 | 43.9 | 18.7 | >330* | $5.5 \times 10^{-3}$ |

The results are again attributable to the presence of soft, unfilled polymer sphere domains which increase compliance, conformability and softness, while at the same time providing building blocks for an infrastructure of spheres in the composition.

In a third system containing nickel powder, similar data is represented in Table VI relating to a series of microsphere containing mixtures.

TABLE VI

| Volume Percent Nickel | Volume Percent Microspheres | Volume Percent Adhesive | Adhesion (gm./cm. width) | Resistance (ohms/cm.$^2$) |
|---|---|---|---|---|
| 7% | 31% | 62 | 99 – 132 | $9.6 \times 10^{-5}$ |
| 7% | 23.3% | 70 | 55 – 99 | $8 \times 10^{-5}$ |
| 7% | 0% | 93 | 220 – 264 | $3.2 \times 10^{-4}$ |
| 8.45 | 33.25 | 58.3 | 33 – 44 | $1.6 \times 10^{-5}$ |
| 8.45 | 0 | 91.55 | 55 – 77 | $8 \times 10^{-5}$ |
| 5.24 | 24.36 | 70.4 | 198 – 232 | $1.6 \times 10^{-4}$ |
| 5.24 | 0 | 94.76 | 232 – 243 | $2.1 \times 10^{-4}$ |

It has long been recognized that the conductivity of carbon black filled rubbers and other polymers is highly dependent upon the degree of mixing. As a result, methods and rates of mixing that be chosen so that the carbon black is unevenly distributed, retains its structure and is distributed to the point of optimum conductivity but no further. To stir solutions of soluble polymers and carbon black suspensions together in such a way as to hold in the required structure is extremely difficult if not impossible. However, if a portion of the polymer system consists of insoluble, but suspendible particles of the required size range, the conductive filler will be mixed only into the soluble phases.

The invention will be further understood with reference to the following non-limiting examples wherein all parts are by weight unless otherwise noted.

EXAMPLE 1

This example illustrates a general method by which infusible, solvent-dispersible, solvent-insoluble, inherently tacky, elastomeric copolymer microspheres are prepared. A 3-liter indented resin flask fitted with mechanical stirrer was charged with 410 grams (90 mole %) iso-octyl acrylate, 38 grams (10 mole %) trimethylamine methacrylimide, 1500 ml. deoxygenated distilled water, and 20 grams alkyl arylpolyethylene oxide sodium sulfonate (commercially available from the Rohm and Haas Company under the trade designation "Triton" X-200). The flask was purged with nitrogen, 1.5 grams benzoyl peroxide added, and the mixture heated to 66° C. and stirred vigorously (about 500 rpm) for 20 hours at 66° C. under nitrogen.

At the end of the 20 hours, the suspension was cooled to 20° C. and filtered through cheesecloth to remove agglomerates, and the solid polymer recovered by coagulation and washing with methanol, to provide a 95–98% yield of discrete microspheres ranging in diameter from about 10 to 150 microns. The copolymer spheres were found to be dispersible, but insoluble in, isopropanol, ethyl acetate, tetrahydrofuran, 2-butanone, benzene, and cyclohexane. Each of these dispersions, when placed in an aerosol container with propellant, was found to provide an excellent spray adhesive which sprayed without plugging or cobwebbing to provide a tacky adhesive layer which readily bonded paper, but permitted the paper to be removed, repositioned and rebonded. The microspheres were removable from the surface on which they were sprayed with an art gum eraser.

Films were cast from each of the above-mentioned dispersions, dried, and found to be of very low tensile strength and comprised of aggressively tacky spherical particles.

EXAMPLE 2

A 500 ml. indented 3-neck flask fitted with a stirrer was charged with 150 ml. of deoxygenated distilled water, 47.5 grams of iso-octyl acrylate, 2.5 grams of trimethylamine methacrylimide, 1.0 grams of ammonium lauryl sulfate (commercially available from the Alcolac Chemicals Co. under the trade designation "Sipex A"), and 0.15 grams of benzoyl peroxide. The mixture was heated to 65° C., maintained for 20 hours with rapid stirring (about 550 rpm), cooled to 20° C., and filtered through cheesecloth to provide a suspension of tacky copolymer microspheres on the order of 10 to 80 microns in diameter. After coagulation and washing with methanol, the tacky, elastomeric microspheres were found to be insoluble in, but dispersible in tetrahydrofuran, 2-butanone, and heptane.

EXAMPLE 3

Preparation of a carbon black filled pressure-sensitive adhesive.

In preparing the adhesive, 75 parts of iso-octyl acrylate ammonium acrylate copolymer microspheres and 750 parts of ethyl acetate were stirred together in a beaker until the spheres were dispersed which took approximately 45 minutes. After mixing, 450 parts of a 25% solids solution of iso-octyl acrylate/acrylamide copolymer adhesive in ethyl acetate were added and stirring continued for about 30 minutes while 20 parts of carbon black, commercially available from the Cabot Co. under the tradename "XC-72R", was stirred in 120 parts of ethyl acetate and then added to the above mixture. The resulting mixture was stirred until well mixed (60 minutes). The resulting pressure-sensitive conductive composition was coated onto metal foils and polymer films. When tested in a tape configuration as a 2 mil film on dead soft copper, the material had a volume resistivity of 125 ohm/cm., and a 180° peel of 17 ounces per inch width.

EXAMPLE 4

Silver-coated sphere filled pressure-sensitive adhesive.

In preparing the silver-coated sphere filled pressure-sensitive adhesive, 75 parts of iso-octyl acrylate/ammonium acrylate copolymer microspheres having a diameter of from about 60 to 80 microns and 750 parts of ethyl acetate were stirred together until the spheres were dispersed. After dispersion, 254 parts of a silver-coated ceramic spheres commercially available from Sigmatronics Co., under the tradename "Sil-Clad 100", was added to the mixture and stirring continued until the mixture was complete. The silver-coated ceramic spheres ranged in size from about 10 to 30 microns in diameter, usually less than 25 microns. The silver coating comprises about 1.5% of the total weight of the coated spheres. To the latter mixture, 608 parts of a 25% solid solution of an iso-octyl acrylate/acrylamide copolymer adhesive in ethyl acetate was added while stirring continued for approximately 30 minutes. The resulting composition was knife coated onto a one ounce soft copper foil and tested in a tape configuration. A volume resistivity of 2.5 ohms/cm. and a 180° peel strength of 15 ounces per inch width of material were measured.

EXAMPLE 5

Preparation of a nickel dust-filled pressure-sensitive adhesive.

A nickel dust-filled pressure-sensitive adhesive was prepared by mixing 75 parts of iso-octyl acrylate/ammonium acrylate copolymer spheres with 750 parts of ethyl acetate. To this dispersion was added 225 parts of a nickel dust commercially available from International Nickel Corp. under the tradename "Nickel-Type 255", while stirring continued. After stirring for about 45 minutes, 1250 parts of a 25% solid solution of iso-octyl acrylate/acrylamide copolymer adhesive in ethyl acetate was added. Stirring continued until the mixture was uniformly dispersed. The resulting composition was knife coated onto a 1 ounce dead soft copper foil and tested in a tape configuration. A volume resistivity of 2.2 ohms/cm. and a 180° peel strength of 16 ounces per inch width were measured.

EXAMPLE 6

A mixture of 10 grams of iso-octyl acrylate/ammonium acrylate/tetramethylene diacrylate terpolymer spheres and 3.5 grams of carbon black were mixed together by ball milling for 3 hours. The mixture was stirred into 13 grams of a mixture of 25 grams of a polypropylene oxide diol having a molecular weight of about 2000. 4.1 Grams of a toluene diisocyanate/toluene diisocyanate end capped polyol mixture comprising about 85 parts toluene diisocyanate, 6 parts polypropylene triol and 8 parts of trimethylol propane having a NCO equivalent weight of about 133–139 grams, and 0.06 grams of phenylmercuryacetate. The resulting sample was placed in a steel mold and cured at a temperature of 95°–100° C. for 6 hours. Shore A hardness was less than 20 and volume resistivity was about 240 ohms/cm.

EXAMPLE 7

A mixture of 7.4 grams of iso-octyl acrylate/ammonium acrylate/tetramethylene diacrylate terpolymer spheres having an average diameter of 40 microns and 2.6 grams of carbon black were stirred into 15 grams of acetic acid curing clear silicone rubber sealer, commercially available from Dow Corning Corp., under the tradename "Silastic." The mixture was molded in an aluminum mold in the form of a disc and allowed to cure at room temperature for four days. Volume resistivity was measured as 580 ohms/cm. and the material had a Shore A hardness of 20–25.

EXAMPLE 8

A suspension was prepared with 25 grams of iso-octyl acrylate/ammonium acrylate copolymer spheres (having an average diameter of about 50 microns) in 200 cc. of benzene. To this suspension was added 25 grams of a styrene-isoprene-styrene block copolymer having a molecular weight range of 7,000–10,000–7,000, and available from Shell Chemical Co. under the tradename, "Kraton 1107", was dissolved in 200 cc. of benzene. Into the latter mixture was stirred a paste comprising 3.1 grams of carbon black in 50 cc. of benzene. After thorough mixing, the mixture was poured out onto a sheet (4 mils in thickness) of polyethylene and the solvent was allowed to evaporate from the mixture. The resulting composition had a Shore A hardness of about 20 and a volume resistivity of about 3400 ohms/cm.

EXAMPLE 9

An electrically conductive tape employing the soft conductive materials of the present invention was prepared by coating a 0.001 inch polyethylene terephthalate film with 4 grains dry weight per 24 inches of adhesive, the adhesive made as follows: 4001 grams of 24.9% solution of a copolymer of 96/4 iso-octyl acrylate/acrylamide, 10 grams of disalicylal propylene diamine ("Copper inhibitor 50" from DuPont), and 30 grams of 4,4'-thiobis (6-tert-butyl-m-cresol) commercially available as "Santowhite Powder" from the Monsanto Co.

The above ingredients were all mixed together with an air mixer. After coating, the tape was dried 2 ½ minutes at 125° F. and 2 ½ minutes at 220° F. After drying, the tape was laminated to rolled and annealed copper foil which weighed 1 oz. per square foot. This laminate was then coated on the copper side with 21 dry grains per 24 square inches of adhesive made as follows:

95 grams of microspheres, as prepared in Example 1.
1125 grams heptane
12 grams tetrahydrofuran
674 grams of carbonyl nickel powder with an average particle size of 3 microns and an apparent density of 0.55 grams per cc. (commercially available from International Nickel Co. under the tradename "Inco Nickel Powder 255")
1670 grams of 24.9% solution of a copolymer of 96/4 iso-octyl acrylate/acrylamide (RD 1243)
5 grams of disalicylal propylene diamine

| 15 grams | 4,4'-thiobis (6-tert-butyl-m-cresol) |

The adhesive was made by combining the microspheres, heptane, and tetrahydrofuran on an electric mixer for 30 minutes. Then, after this mixture has set overnight, the mixture was mixed on an electric mixer for 90 minutes more. The remaining ingredients were then added using an air mixer and the entire composition was mixed for 3 hours, reaching a temperature of about 120° F.

The adhesive mixture was then coated on the laminate and the tape dried for 5 minutes at 100° F. and for 5 minutes at 220° F. Silicone-treated paper liner was wound into the tape as it was round, the liner being removed before use.

The tape was tested on a circuit board consisting of copper lines about 1/32 inch wide on 1/16 inch centers and the tape covering about ½ inch length on all the fingers (i.e., contact area was about 0.016 square inch). Contact was obtained by placing the tape over the board, heating for about 10 seconds with an air gun at about 300° F., then rolling three times with heavy pressure (50 pounds or more) with a hard rubber roller. Resistance to individual fingers ranged from 0.1 ohms to 0.35 ohms and averaged 0.15 ohms. The above circuits were then nickel plated, followed by gold plating. The thickness of the gold plating was measured with a beta counter and found to be uniform. Removal of the tape after plating gave a uniform plating line, with no indication of plating along the sides of the elevated fingers. Gold was deposited on the sides of the tape, but not on the back, where the polyester film protected it; but during electroplating contact to the current source was easily obtained through this protective film.

What is claimed is:

1. A soft, conformable, electrically conductive composition comprising:
   (a) a soft polymeric binder forming a coherent matrix and having a Shore A hardness of less than about 40,
   (b) a plurality of insoluble, deformable, generally non-reactive and non-conductive, tacky, spherical domains having Shore A hardness less than about 40 consisting of elastic copolymer of at least one monomer selected from the group consisting of substantially oil-insoluble, water-soluble ionic monomers and maleic anhydride and at least one alkyl acrylate monomer which, as a homopolymer, has $T_g$ below about $-20°$ C. dispersed in said binder in an amount of from about 15 to 60 percent by volume of said composition; and
   (c) an electrically conductive filler dispersed in said binder interjacent said domains in an amount effective to provide at least one electrically conductive pathway through said composition.

2. A composition according to claim 1 wherein said polymeric binder is a pressure-sensitive adhesive.

3. The composition of claim 2 wherein said adhesive is an iso-octylacrylate-acrylamide copolymer.

4. The composition of claim 2 wherein said adhesive is an iso-octylacrylate and acrylic acid copolymer.

5. The composition of claim 2 wherein said adhesive is a polybutene.

6. The composition of claim 2 wherein said spherical domains are iso-octylacrylate-ammonium acrylate copolymer microspheres.

7. An electrically conductive sheet comprising the composition of claim 2.

8. A normally tacky and pressure-sensitive adhesive tape comprising a flexible self-supporting sheet having the composition of claim 2 adhered to one major surface thereof, the thickness of said composition being not less than about 0.054 mm.

9. The composition of claim 1 wherein said conductive filler is selected from the group consisting of finely divided carbon black, graphite, silver, nickel and copper.

10. The composition of claim 9 wherein said conductive filler is nickel particles having an average particle size of from 2 to 4 microns and is present in the composition at from about 1 to 25 percent by volume.

11. The composition of claim 9 wherein said conductive filler is silver-coated ceramic particles having an average diameter of from about 5 to 40 microns and comprises from 5 to 60 percent by volume of the composition.

12. A soft, conformable, conductive, pressure-sensitive adhesive composition comprising:
   (a) a soft polymeric pressure-sensitive adhesive binder forming a coherent matrix, said binder selected from the group consisting of acrylate copolymer, tackified polybutylene, tackified rubber resin and vinyl ester;
   (b) from about 15 to 60 percent, based on the volume of the total composition, being insoluble, deformable, generally non-reactive, and non-conductive, tacky spherical domains having Shore A hardness less than about 40 and a diameter from about 6 to 80 microns randomly dispersed in said adhesive binder, said domains consisting of about 90–99.5 percent by weight of at least one alkyl acrylate ester which as a homopolymer has $T_g$ below about $-20°$ C. and about 10 to about 0.5 percent by weight of at least one monomer of the group consisting of substantially oil-insoluble, water-soluble ionic monomers and maleic anhydride; and
   (c) from about 1 to 60 percent of the total composition by volume being electrically conductive particles having particle size less than 100 microns and less than the diameter of said domains dispersed in said adhesive binder interjacent said domains; wherein said particles form electrically conductive pathways through said composition, said domains imparting conformability to said composition.

* * * * *